Aug. 17, 1926.  
R. F. KINSLEY  
1,596,739  
APPARATUS FOR MOLDING RUBBER HEELS  
Filed May 19, 1924   2 Sheets-Sheet 1
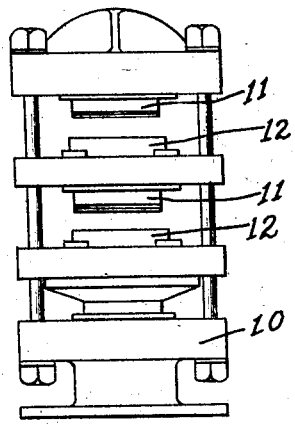
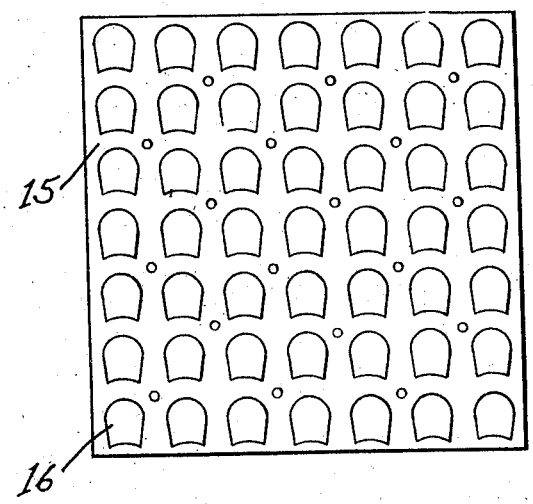
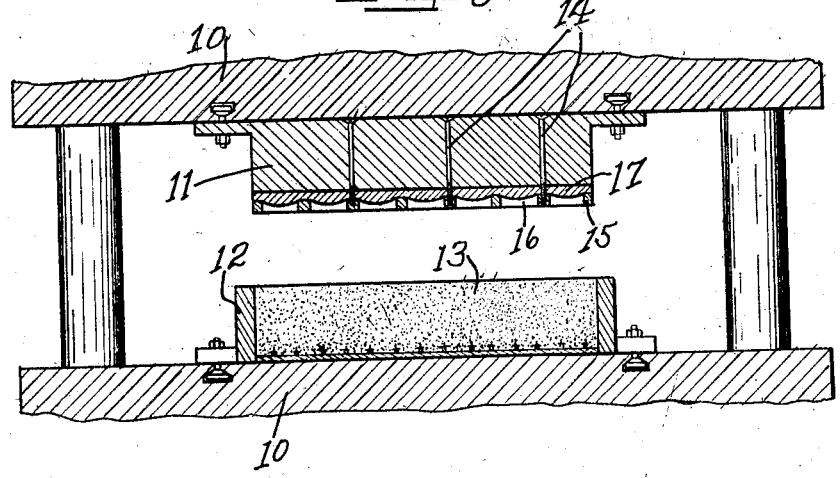
Inventor  
Richard F. Kinsley  
by  Attys.

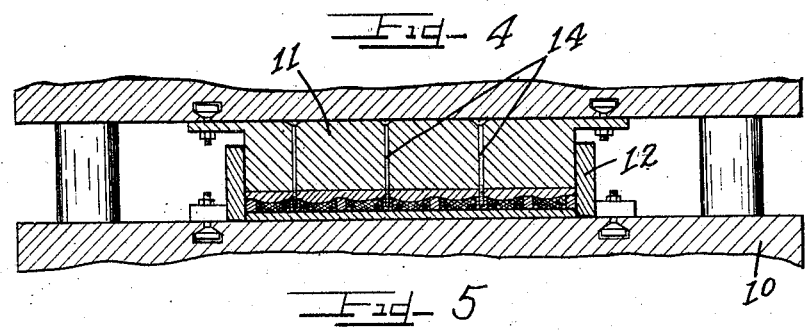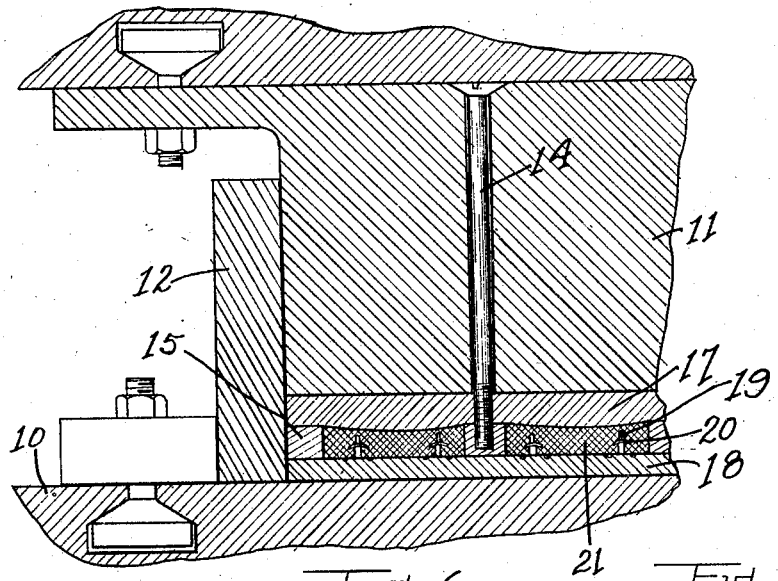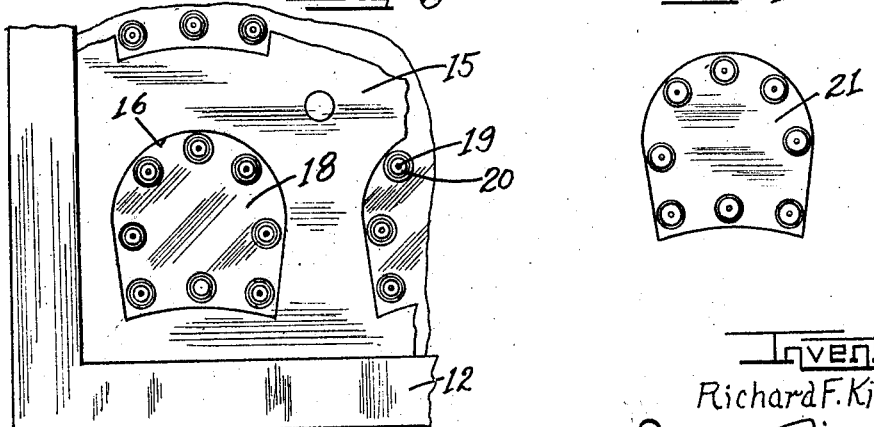

Patented Aug. 17, 1926.

1,596,739

UNITED STATES PATENT OFFICE.

RICHARD F. KINSLEY, OF CHICAGO, ILLINOIS, ASSIGNOR TO DRYDEN RUBBER CO., OF CHICAGO, ILLINOIS, A CORPORATION OF ILLINOIS.

APPARATUS FOR MOLDING RUBBER HEELS.

Application filed May 19, 1924. Serial No. 714,196.

This invention relates to the manufacture of rubber articles more particularly from ground waste vulcanized rubber scrap.

Rubber articles are formed with varying amounts of sulphur in their composition. Thus for example, automobile inner tubes are low in sulphur and hard rubber articles very high in sulphur. Further, nearly all rubber articles contain free uncombined sulphur.

It is always possible to make rubber articles from ground waste vulcanized rubber scrap without the addition of crude rubber provided that the rubber in the article has a higher percentage of combined sulphur than the scrap. It is not always possible, however, to proceed in the opposite direction, i. e. to make articles of lower sulphur content than the scrap, without adding raw unvulcanized rubber to the mix.

One of the principal objects of this invention is to provide an improved process and means for making articles from waste vulcanized rubber scrap.

A further object of the invention is to improve the method and means for making rubber articles whether wholly from waste vulcanized scrap, wholly from raw rubber or from mixtures of the two.

Other and further important objects of this invention will be apparent from the disclosures in the specification and drawings.

Apparatus (in a preferred form) suitable for carrying the invention into effect is illustrated on the drawings and hereinafter more fully described.

On the drawings:

Figure 1 is a side elevation of a vulcanizing press suitable for carrying out the process.

Figure 2 is a bottom view of the upper die of the press.

Figure 3 is a vertical section through a portion of the press at the commencement of the process.

Figure 4 is a view similar to Figure 3 taken at the end of the process.

Figure 5 is an enlarged sectional view of a portion of the press.

Figure 6 is a plan view of the lower die with the grid normally secured to the upper die resting thereupon.

Figure 7 is a bottom view of one of the completed heels.

As shown on the drawings:

The usual hydraulic vulcanizing press 10 is employed. In this press are arranged male and female dies 11 and 12. The mix, preferably consisting of finely ground waste rubber scrap without admixture with any raw rubber but if desired containing added amounts of sulphur and/or the usual filling materials, is inserted in the die 12 to form a uniform layer 13 therein. To the under side of the die 11 is secured by screws 14 a grid 15 having apertures 16 therein of the contour of the heels or other articles required. Between the grid 15 and the die 11 is arranged a plate 17 having a series of concave bulges adapted to give the finished heel the desired dished form.

After the die 12 has been filled with finely ground waste rubber scrap as shown in Figure 3 the dies are forced together to squeeze the rubber into the apertures 16 in the grid 15.

At the bottom of the die 12 is arranged a plate 18 having arranged thereon a series of pins 19. These pins are thin at the top and thick at the bottom to provide a shoulder on which may rest a washer 20. In view of this arrangement as the dies are brought together the rubber is molded around the washers so as to leave the latter firmly embedded in the heels.

The time of treatment will vary accordingly to the nature of the mix, the pressure, temperature and other factors. Ordinarily, however, it is around 15 minutes.

The next step after raising the upper die 11 is to slide the lower die outwards to allow the plate 18 to drop out for removal of the finished heels 21. As the heels are lifted off the pins, the washers being embedded in the rubber are removed with the heels and the next step is to place another set of washers on the pins and replace the plate with its surrounding die back in position in the press.

In some cases the grid which provides the heel forming recesses may be arranged on the lower die although such an arrangement is not so convenient as that shown since the grid would then interfere somewhat with the insertion of washers upon the pins 19.

The waste vulcanized rubber scrap used is selected and proportioned according to the degree of vulcanization required in the final article. Thus for rubber heels it has been found that automobile tire treads are too highly vulcanized to enable treads alone to be used with the best results. The tread rubber should have mixed therewith some less highly vulcanized scrap such, for example, as automobile inner tubes.

While the invention has been described more particularly in connection with the manufacture of articles wholly from ground waste vulcanized rubber scrap it is also applicable to other mixes consisting in whole or in part of unvulcanized raw rubber.

The invention is not restricted to the use of finely ground rubber and in some cases the rubber may be worked into sheets upon mixing rolls and then cut into squares, of the size of the mould 12 and inserted therein. The material of the sheet is then compressed to force it into the apertures in the grid 15 and to mold it around the pins 19.

By such a method there is little or no scrap to be re-worked on the rolls as is always the case where blanks of substantially the contour of the heels desired are cut or stamped from such sheets. In general continued re-working of even unvulcanized rubber is not desirable and by the method just described such re-working is almost wholly avoided.

The temperatures employed in the various operations are those commonly used in vulcanizing operations. For most mixtures a temperature of 180° C. is satisfactory.

The pressures used are high. Thus it has been found that 1800 lbs. per sq. in. gives satisfactory results.

I am aware that various details in operation and construction of apparatus employed may be varied through a wide range without departing from the principles of this invention, and I therefore do not purpose limiting the patent granted otherwise than as necessitated by the prior art.

I claim as my invention:

An apparatus for making rubber heels comprising a base plate, a series of pins thereon for the reception of washers, a retaining member around said plate, a die adapted to enter said retaining member to compress the material therein, said die having a series of recesses on its under surface of the size of the completed heel, means for producing relative movement between said die on the one hand and the base plate and retaining member on the other, and means for simultaneously heating the material.

In testimony whereof I have hereunto subscribed my name.

RICHARD F. KINSLEY.